Figure 5:
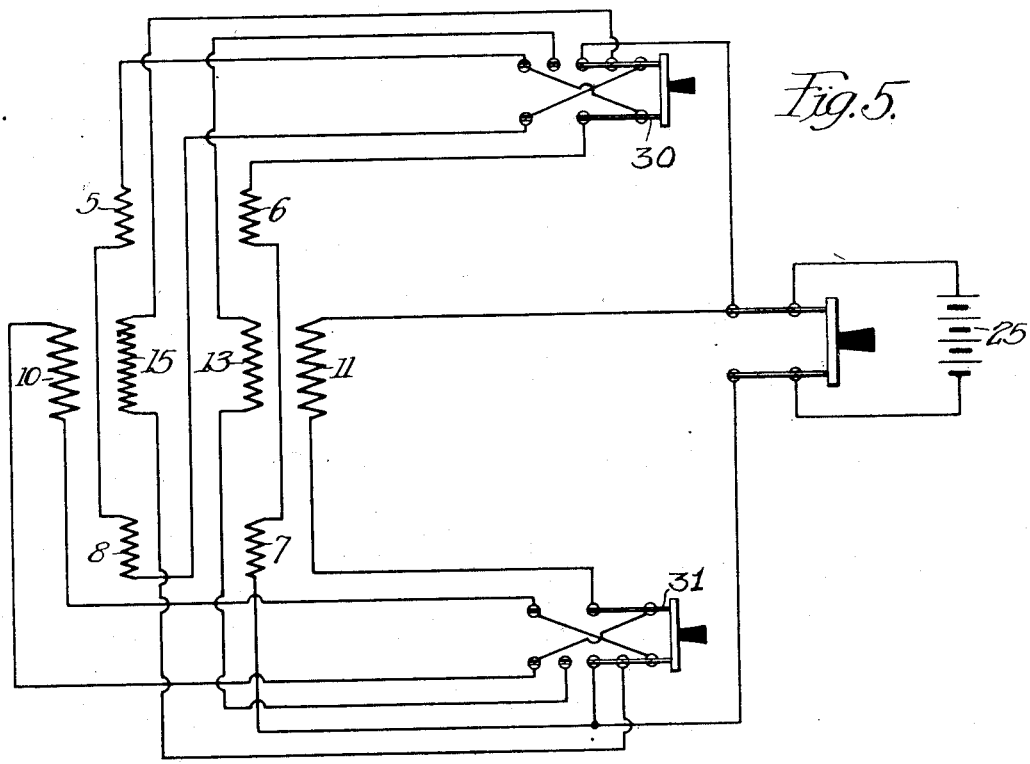

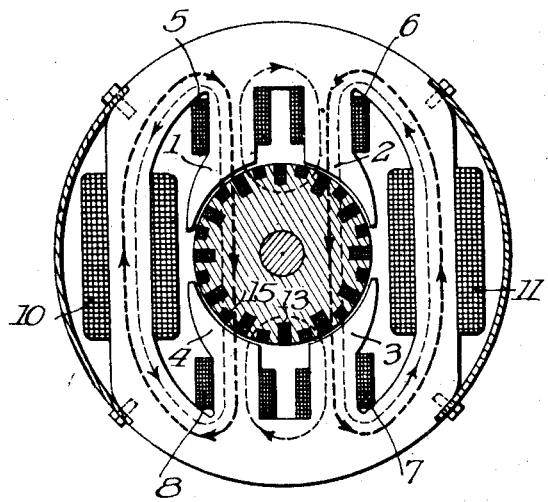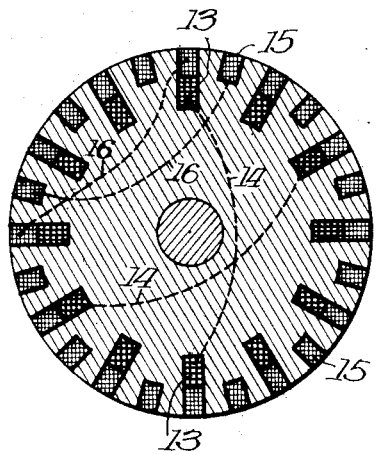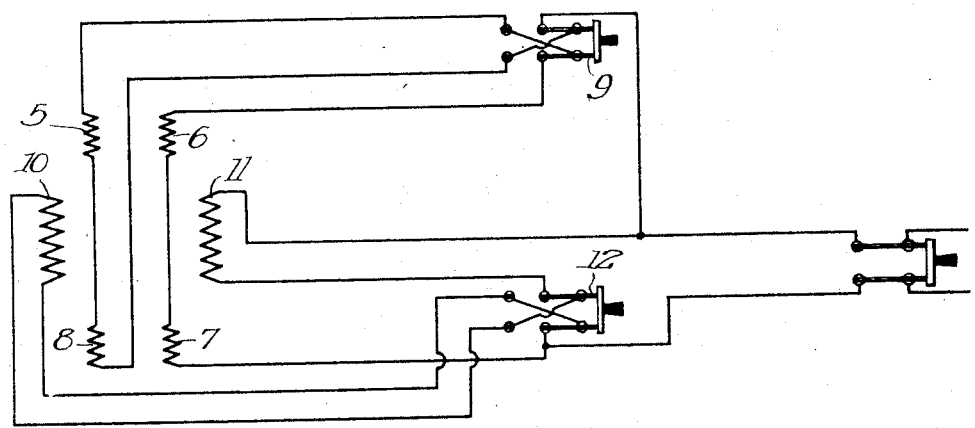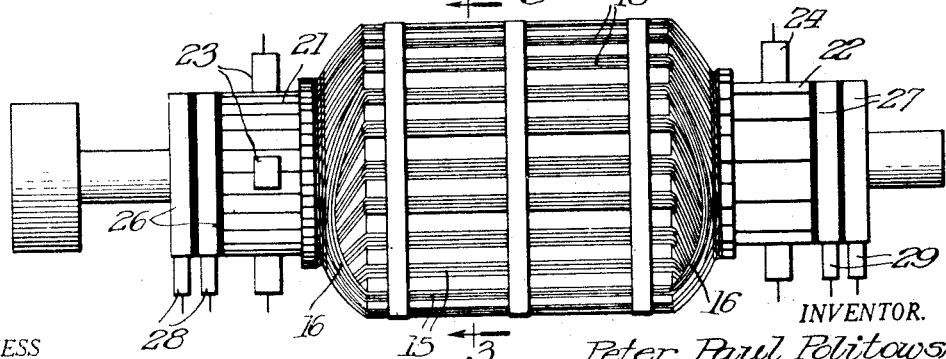

UNITED STATES PATENT OFFICE.

PETER PAUL POLITOWSKI, OF CHICAGO, ILLINOIS.

DYNAMO-ELECTRIC MACHINE.

1,361,546.   Specification of Letters Patent.   Patented Dec. 7, 1920.

Application filed June 23, 1917. Serial No. 176,471.

*To all whom it may concern:*

Be it known that I, PETER PAUL POLITOWSKI, a citizen of the United States, residing at Chicago, in the county of Cook and State of Illinois, have invented certain new and useful Improvements in Dynamo-Electric Machines, of which the following is a specification.

This invention relates to dynamoelectric machines to be used for various purposes, and the various objects of the invention will be fully set forth hereinafter, in connection with the description thereof.

Of the acompanying drawings, Figure 1 is a central cross-section of a machine, embodying features of my invention. Fig. 2 is a plan view of the armature of the machine. Fig. 3 is a section along the line 3—3 of Fig. 2. Fig. 4 is a diagrammatic drawing of the field windings of the machine and the control switches. And Fig. 5 is a diagrammatic drawing of all of the windings and connecting wires and switches.

One of the features of my invention is the provision of a dynamoelectric machine having poles constructed, wired and controlled so that the number of effective poles in use may be varied. In this particular instance, as an illustration of my invention, I show a machine which may have either two or four poles, as may be desired. To accomplish this I construct the field members of the machine as indicated in Fig. 1, in which the field poles 1, 2, 3 and 4, are grouped into pairs. While the faces of the poles are equally spaced and space equal portions of the armature surface, yet the shanks of the poles 1 and 2, and 3 and 4 are, respectively, nearer together than the shanks of the poles 1 and 4, or 2 and 3. The pole shanks however, have coils 5, 6, 7 and 8 wound in any ordinary and suitable manner. If these coils are connected in the usual manner, so as to pass the current through the coils in the proper directions, considering now only these coils, the machine will comprise an ordinary set of four poles, and the magnetism will flow in the fields as indicated by the lighter dotted lines. This will be the case when the field coils 5, 6, 7, and 8, are connected through the double pole, double throw switch 9, indicated in Fig. 4, with the switch thrown to the right.

In order to produce a two pole machine, however, the switch 9 is thrown to the left, and the adjacent coils 5 and 6, will produce like magnetism in the poles toward the armature, but magnetism unlike that produced by coils 7 and 8, and hence the magnetism will flow through the armature and the field as indicated by the heavy dotted lines, thus producing a two pole field.

In carrying out my invention I also place coils 10 and 11 on the frame of the field, connecting these coils to a double pole double throw switch 12, and, considering now these coils only, when this switch is thrown to the left the magnetism will flow as indicated by the heavy dotted lines, forming a two pole field as before. But when the switch 12 is thrown to the right the current through coil 10 will be reversed, and the magnetism will flow in the armature as indicated by the lighter dotted lines, thus having the effect of a four pole machine. It is evident that the coils may all be used together, as when both switches are thrown to the left the coils will coact to form two poles, and when both switches are thrown to the right the coils will coact to form four poles.

In view of the fact that the coil pitch of an armature depends upon the pole pitch, and hence, the number of poles; in order to use two or four poles, as desired, I place on the armature two sets of coils, one set with a pitch suitable for four poles, and the other with a pitch suitable for two poles. Also, as the slots for the two pole coils may be spaced farther apart than those for the four poles, I provide in the armature every second slot much larger than the intervening slots, and confine the two-pole coils to the large slots, and use all of the slots for the four pole coils. Thus, referring to Fig. 3, coils 13 pass from one side of the armature to the other, as indicated by the dotted lines 14, while the pitch of the coils 15 is about one fourth of the circumference of the armature, as indicated by the dotted lines 16.

As coils for two poles cannot be operated by brushes adapted to coils for four poles, I provide two commutators 21 and 22 for the armature, and two sets of brushes, 23 and 24, as indicated in Fig. 2, the two-pole coils being connected, in any ordinary and suitable manner to the right-hand commutator segments, and the four-pole coils to the left-hand segments. I also have but a few turns of wire in the two-pole coils and many turns in the four-pole coils, so that the two-pole coils will produce a much higher speed than the four-pole when the machine is operated as a motor, or will produce a much lower voltage when the machine is operated as a generator, provided that when four poles are used the field strength is substantially the same as when two poles are used.

It will be seen, then, that with this machine operating as a motor, by using two poles only, a very high speed may be obtained, particularly if one set only of the field coils are energized so as to form a weak field. While a comparatively very low speed may be obtained by operating it as a four pole motor, particularly with all of the field coils energized cumulatively, I thus am able to combine the speed characteristics of the number of turns in the coils, the number of field poles, and the strength of the field, when the machine is used either as a motor or a generator.

In order that alternating current may be generated with my machine I provide the rings 26 and 27 which are insulated from the armature and connected to the coils thereof in an ordinary manner, so that by the use of brushes 28 and 29 alternating currents of widely differing voltages may be taken from the armature, brushes 28 being used for the high voltage generated when four poles are used, and brushes 29 being used for relatively low voltage when two poles are used.

One application of my dynamoelectric machine is to automobile uses. When a single unit machine is used on an automobile for starting the engine and also for charging the battery, it is necessary to raise the voltage of the machine when used as a generator materially higher than when used as a motor, and it is also desirable to run the machine as a motor at a much higher speed than when used as a generator. When my machine is used for this purpose the coils may be connected as indicated diagrammatically in Fig. 5. When the switches 30 and 31 are thrown to the right the machine is adapted to be used as a generator with four poles and operating the coils 15 having the greater number of turns, and hence producing the higher voltage; when the switches are thrown to the left the machine is adapted to operate as a motor of very high speed, as it has but two poles, and the coils 13 with relatively a few number of turns are in use.

I claim as my invention:

1. The combination of a dynamoelectric machine, a battery operatively connected with said machine, means for varying the number of poles of said machine, two sets of coils mounted on the armature of said machine, the coil pitch of one of said sets being unlike the coil pitch of the other set and means for rendering ineffective either of said sets.

2. A field magnetic system of a dynamoelectric machine, comprising a ring of iron, four field poles projecting inwardly from said ring, a coil of wire encircling each of said poles, two coils of wire encircling said ring on opposite sides thereof, each of said latter coils being positioned between two of said poles, and means for alternately connecting all of said coils so as to produce a four pole and a two pole field.

3. A field magnetic system of a dynamoelectric machine, comprising a ring of iron, four field poles projecting inwardly from said ring, a coil of wire encircling each of said poles, two coils of wire encircling said ring on opposite sides thereof, and each of said latter coils being positioned between two of said poles, in combination with an armature having two sets of coils with unlike pitches, and means for alternately throwing said sets into service.

In testimony whereof, I hereunto set my hand.

PETER PAUL POLITOWSKI.